United States Patent Office

3,350,411
Patented Oct. 31, 1967

3,350,411
PROCESS FOR PREPARING 3-METHYLFLAVONE-8-CARBOXYLIC ACID
Paolo Da Re, Perugia, Italy, assignor, by mesne assignments, to Societe d'Exploitation Chimiques et Pharmaceutiques Seceph S.A., Grison, Switzerland
No Drawing. Filed Aug. 3, 1964, Ser. No. 395,346
Claims priority, application Italy, Oct. 10, 1963,
20,688/63
4 Claims. (Cl. 260—345.2)

The present invention relates to a new and advantageous process for the preparation of 3-methyl-flavone-8-carboxylic acid, a very important intermediate for obtaining various compounds which are interesting from a pharmaceutical point of view, more particularly basic esters, such as are described in previous patents (U.S. 2,921,070 and Canada 635,965), with desirable pharmacological properties.

This acid has heretofore been prepared from the intermediate 3-propionyl-2-hydroxy-1-carboxylbenzene, but such procedure is relatively more complicated and less attractive from an economic standpoint as is the process according to this invention. It has been found that the acid may be prepared with a new method which is moreover economically and industrially more advantageous by starting from new intermediates, not described in the scientific literature.

According to this invention, an 8-alkenyl-3-methyl-flavone, for example the 8-propenyl- or 8-allyl derivative, not described in literature, whose preparation is given further on, in Examples 1 and 2, is submitted to the action of an oxidizing agent, such as for example KMnO₄, in the presence of magnesium salts, in pyridine/water medium, in order to transform it in 3-methylflavone-8-carboxylic acid, which is separated by acidification of the filtered reaction mixture, and successively condensed with the chloride of an aminoalcohol hydrochloride for example with the piperidinoethyl chloride hydrochloride or morpholinoethyl chloride hydrochloride, in the presence of alcoholic KOH, with formation of the hydrochloride of a basic ester, according to the schema:

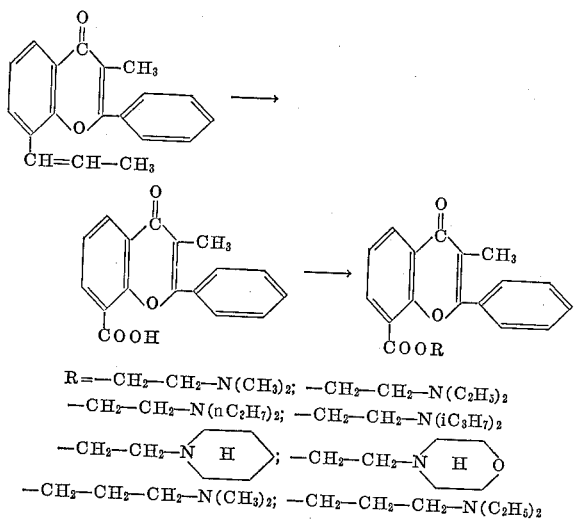

R=—CH₂—CH₂—N(CH₃)₂; —CH₂—CH₂—N(C₂H₅)₂
—CH₂—CH₂—N(nC₃H₇)₂; —CH₂—CH₂—N(iC₃H₇)₂
—CH₂—CH₂—N⟨ H ⟩; —CH₂—CH₂—N⟨ H O ⟩
—CH₂—CH₂—CH₂—N(CH₃)₂; —CH₂—CH₂—CH₂—N(C₂H₅)₂

EXAMPLES (1) *8-allyl-3-methyl-flavone*

In a round-bottomed, three-necked, 1 liter flask, fitted with stirrer, reflux bulb cooler, with CaCl₂ closure and an open neck, for a wide-mouthed funnel for powders, 100 g. of 3-allyl-2-hydroxypropiophenone (described by T. Takahoschi et al., J. Pharm. Soc. Japan 74, 48 (1954) and abstracted in C.A. 49, 1623), are mixed under stirring with 220 g. of benzoyl chloride. To this mixture are then added, slowly and under agitation, 250 g. of sodium benzoate powder.

The mixture is heated on an oil bath at 185–195° C. for 8 hours, then while still melted, is poured in a dish. It is allowed to cool, taken up with about 700 ml. commercial acetone and filtered. The residue on the funnel is transferred into a mixture of 200 g. NaOH and 4 l. water; about 700 g. of ice are added, and to this mixture, kept under agitation, the former acetonic filtrate is added dropwise.

The solid which separates, is filtered, thoroughly washed with water and the cake is pressed dry on the funnel and dried then in a hot air oven. 130 g. of raw product are obtained which are recrystallized from ligroine in the ratio 1:5, giving 106 g. of yellow, crystalline product, M.P. 87–89° C.

(2) *8-propenyl-3-methyl-flavone*

By the above procedure, by employing 3-propenyl-2-hydroxy-propiophenone (1) and the same amounts of the other reactants, 140 g. of raw product are obtained, which, recrystallized from ligroine, give 113 g. of 8-propenyl-3-methylflavone as yellow crystals, M.P. 85–88° C.

(3) *3-methylflavone-8-carboxylic acid*

30 g. of 8-allyl-3-methylflavone are suspended in a mixture of 165 ml. water and 110 ml. pyridine, in a large-necked 2 l. container, provided with agitator and thermometer, placed in a cold water circulation bath.

In a period of two hours a mixture of 92 g. of potassium permanganate and 27.9 g. of magnesium nitrate hexahydrate is added in portions.

The temperature is maintained within 15 and 18° C. When the addition is complete, the mixture is diluted with water (400 ml.) and 10 g. of kieselguhr are added, and, after about 20 min. stirring, the mixture is filtered on a Büchner funnel. The filter cake is washed thoroughly with water and the decolorized filtrate is poured, while stirring vigorously, into a very cold mixture of 200 ml. conc. HCl and 200 ml. water. The solid which separates is filtered on a Büchner funnel, suspended in 600 ml. of water in which it dissolves by vigorous stirring and addition of NaHCO₃. The solution is filtered, if necessary, and the filtrate is poured, under vigorous stirring, into a mixture of 200 ml. HCl and 200 ml. water. The separated solid is filtered, washed to neutral with water and dried in an oven at 70° C., in vacuum, giving 12–12.5 g. of 3-methylflavone-8-carboxylic acid, M.P. 215–20° C., with an acidimetric titer of 97.5%, sufficiently pure for the successive use.

By crystallization from 150 ml. of methanol, 9.1 g. of crystalline product, M.P. 227–229° C., are obtained.
Analysis for C₁₇H₁₂O₄. Calculated: C, 72.85%; H, 4.31%. Found: C, 72.81%; H, 4.28%.

(4) *3-methylflavone-8-carboxylic acid*

By the above procedure and employing the following ratios of the reactants:

30 g. 8-propenyl-3-methylflavone
150 ml. pyridine
200 ml. water
45.9 g. KMnO₄
30.0 g. Mg(NO₃)₂.6H₂O 13.2–13.5 g. of raw product are obtained, M.P. 223–26° C.

Crystallization from 150 ml. of aqueous methanol gives 9.3 g. of crystalline product, M.P. 227–229° C.
Analysis for C₁₇H₁₂O₄. Calculated: C, 72.85%; H, 4.31%. Found: C, 72.78%; H, 4.25%.

(5) *piperidinoethyl-3-methylflavone - 8 - carboxylate.HCl*

7.29 g. of the crystalline 3-methylflavone-8-carboxylic acid, obtained in Examples 3 and 4, and 4.79 g. of piperidinoethyl chloride hydrochloride (equimolar amounts) are suspended in 100 ml. of isopropanol, distilled on CaO, and added, under stirring, to 24.9 ml. of 2.09 N methyl alcoholic KOH.

The mixture is stirred and boiled for 30 minutes, immediately cooled, and, finally evaporated under reduced pressure. The residue is taken up with benzene, the salts are dissolved by adding water alcalinized with a little of $Na_2CO_3$ and the mixture is transferred in a separatory funnel. It is shaked, the organic phase is separated, washed once with water, dried on $Na_2SO_4$ and evaporated under reduced pressure.

The residual base, extracted with ether, gives the hydrochloride by treatment with chlorhydric ethanol. On crystallization from methanol, piperidinoethyl-3-methylflavone-8-carboxylate hydrochloride, M.P. 232–34° C., is obtained.

Analysis for $C_{24}H_{26}O_4NCl$. Calculated: N, 3.27%; Cl, 8.14%. Found: N, 3.16%; Cl, 8.20%.

(6) *morpholinoethyl-3-methylflavone-8-carboxylate.HCl*

On reacting equimolar amounts of 3-methylflavone-8-carboxylic acid and morpholinoethyl chloride hydrochloride, according to the process described in the above example the morpholinoethyl-3-methylflavone-8-carboxylate.HCl is obtained.

$C_{23}H_{24}O_5NCl$, M.P. 233–34° C.

In analogous manner the following products are obtained:

Dimethylaminoethyl - 3 - methylflavon - 8 - carboxylate. HCL, $C_{21}H_{22}O_4NCl$, M.P. 177–78° C.
Diethylaminoethyl - 3 - methylflavon-8-carboxylate.HCl, $C_{23}H_{26}O_4NCl$, M.P. 163–64° C.
Dipropylaminoethyl - 3-methylflavon-8-carboxylate.HCl, $C_{25}H_{30}O_4NCl$, M.P. 212–15° C.
Diisopropylaminoethyl - 3 - methylflavon-8-carboxylate. HCl, $C_{25}H_{30}O_4NCl$, M.P. 190–92° C.
Dimethylaminopropyl-3-methylflavon - 8 - carboxylate. HCl, $C_{22}H_{24}O_4NCl$, M.P. 207–10° C.
Diethylaminopropyl - 3 - methylflavone - 8 - carboxylate.HCl, $C_{24}H_{28}O_4NCl$, M.P. 187–89° C.

(1) This product, not described in literature, is obtained by isomerization of the corresponding 3-allyl-derivative according to the usual procedure described in Organic Reactions, 2, 27 (1944), as a yellow solid (from methanol), M.P. 84–86° C.

What I claim is:

1. A process for preparing 3-methylflavone-8-carboxylic acid having the following formula:

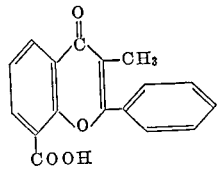

comprising oxidizing an 8-alkenyl-3-methylflavone with an oxidizing agent capable of oxidizing a double bond in the side chain in the presence of magnesium nitrate in a pyridine/water medium at a temperature of 15°–18° C., filtering the reaction products, acidifying the filtrate with mineral acid and recovering the separated solid 3-methylflavone-8-carboxylic acid product.

2. A process in accordance with claim 1, characterized in that the product subjected to oxidation is 8-allyl-3-methylflavone.

3. A process in accordance with claim 1, characterized in that the product subjected to oxidation is 8-propenyl-3-methylflavone.

4. A process in accordance to claim 1 wherein the product subjected to oxidation is selected from the group consisting of:
8-allyl-3-methylflavone and
8-propenyl-3-methylflavone and the oxidizing agent is potassium permanganate.

References Cited

UNITED STATES PATENTS 3,244,706   4/1966   Sutton            260—247.2

ALEX MAZEL, *Primary Examiner.*

J. TOVAR, *Assistant Examiner.*